United States Patent

[11] 3,586,336

[72] Inventor Leonard Rosenblatt
Beechhurst, N.Y.
[21] Appl. No. 703,725
[22] Filed Feb. 7, 1968
[45] Patented June 22, 1971
[73] Assignee Scovill Manfacturing Company
Waterbury, Conn.

[54] MAGNETIC TAPE CASSETTE-TYPE RECORDING AND PLAYBACK MECHANISM
12 Claims, 5 Drawing Figs.

[52] U.S. Cl. .......... 274/4, 179/100.2
[51] Int. Cl. .......... G11b 5/00
[50] Field of Search .......... 274/4, 11; 242/55.13; 179/100.2 Z

[56] References Cited

UNITED STATES PATENTS

| | | | |
|---|---|---|---|
| 3,417,938 | 12/1968 | Makakis et al. | 242/55.13 |
| 3,416,150 | 12/1968 | Lindberg, Jr. | 179/100.2 |
| 3,395,871 | 8/1968 | Ackermann et al. | 242/55.13 |
| 3,394,898 | 7/1968 | Laa | 242/55.13 |
| 3,285,526 | 11/1966 | Moore | 179/100.2 |
| 3,037,093 | 5/1962 | Nowlan | 179/100.2 |
| 2,914,620 | 11/1959 | Dale | 179/100.2 |
| 2,466,514 | 4/1949 | Vagtborg | 179/100.2 |
| 3,385,534 | 5/1968 | Staar | 274/4 (E) |

FOREIGN PATENTS

| | | | |
|---|---|---|---|
| 1,498,288 | 1967 | France | 274/4 |

*Primary Examiner*—William D. Martin, Jr.
*Assistant Examiner*—Dennis A. Dearing
*Attorney*—Sparrow and Sparrow

ABSTRACT: A magnetic tape sound recording and playback device for use with a cassette-type tape cartridge. Independent motor drives for winding and unwinding of the tape spools in the cassette and a further independent motor for driving the tape capstan. Two independent feelers which sense the presence or absence of tabs in the rear surface of the cassette for controlling the erasing or recording electronics of the device.

INVENTOR.
LEONARD ROSENBLATT

BY
SPARROW AND SPARROW

ATTORNEYS

INVENTOR.
LEONARD ROSENBLATT
BY
SPARROW AND SPARROW
ATTORNEYS

MAGNETIC TAPE CASSETTE-TYPE RECORDING AND PLAYBACK MECHANISM

BACKGROUND OF THE INVENTION

This invention relates to tape recording and playback devices for tape cartridges which contain a spool of magnetic tape, and particularly to a device for being used with a "Cassette"-type tape cartridge such as it is, for example, produced by the Philips Corporation.

Conventional recording and playback devices using other cartridges than the cassette-type have only one drive means for the spool in the cartridge and cannot turn the cartridge over for recording or playing a second sound track on the tape. These devices have to respool the tape first before the second track may be used. Furthermore, known devices do not have facilities for partially erasing or recording portions of sounds on the tape or for preventing one track from being electronically erased in such cases where it is desired to keep a recording permanently. Other devices do not have provisions for preventing the cartridge to be inserted incorrectly or incompletely prior to starting the device running.

SUMMARY

The device or machine is designed to accept the "Cassette"-type tape cartridge, such as, for example, that produced by Philips Corporation.

According to the invention, the cassette is inserted sideways with its shortest side first rather than front or back with its longest side, through a keyed slot into a raised holder the slot is shaped so that the cassette cannot be moved into operative position in the holder which also may be keyed, until the cassette is fully in and latched into place. The holder is held in raised position by a spring or similar type device. If the cassette is not fully inserted it will eject; when fully inserted, the holder can be lowered manually or automatically into the machine's operating position. This lowering allows the machine's driving members, namely the two reel drives and capstan shaft to enter appropriate holes in the cassette and also places other openings in the cassette in proper position to allow the magnetic head or heads and the drive puck to enter the cassette. The holder is also held in the lowered position by spring means. If the heads and drive puck are not in the proper position, the holder cannot be raised or lowered. The heads and puck are mounted on a slide which moves them in and out of the apertures in the cassette. This slide is motivated either by a solenoid or manually. Another solenoid or manual lever can move the puck from the cassette so that it could be retracted, independently of the slide, which would allow the tape to be traversed or moved rapidly while the heads are in the play/record position. In the rear surface of the cassette are two removable tabs. In order to prevent accidental erasure of the recording on one track or set of tracks, the appropriate tab is removed. To prevent accidental erasure of the recording on the other track or set of tracks, the other appropriate tab is removed.

The machine is provided with two independent sensors or feelers which sense the presence or absence of said removable tabs. These sensors are independently mechanically or electrically connected to the erase/ record electronics so that the erase/record function is disabled for those recorded tracks which should not be erased. By providing two sensors and due to the novel mechanism, it is possible to play/record and/or erase up to the entire width of tape without danger of accidental erasure or without the necessity of turning the cassette over for the opposite side. This feature of not having to remove and turn over the cassette in order to play or record in the opposite direction does not prevent the device according to the invention from operating in the conventional manner where the tape can be played or recorded in one direction only, and to play or record in the opposite direction, the cassette must be removed, turned over and reinserted. Each reel is independently motor driven through a belt and pulley arrangement. The capstan shaft is independently driven by a third motor. When the tape is either played/recorded or fast wound in one direction, the motors are electrically energized a certain way or ways. When the direction is reversed for play/record or fast wind, the energization of the motors is changed.

When the cassette holder is raised, there are two members on the holder which remove the sensors from openings behind the removable tabs, if the tabs have been removed. This sensor removal is accomplished during the raising of the holder. When the holder is in the fully raised positions, the cassette can be removed, unimpeded by the sensors. Removal of the cassette is accomplished by pressing the cassette further into the holder. This further movement unlatches a spring-loaded member which ejects the cassette. When the cassette is fully ejected, this spring-loaded member may act as a closure in the keyed slot so foreign matter cannot enter the machine. When the cassette is inserted in the holder, it is retained in one direction by springs on the holder. When the holder is lowered onto the driving members of the machine, it is also lowered onto guides which enter appropriate holes in the cassette. These guides exactly position the cassette. In addition the sensors which are spring loaded, now press against the rear of the cassette, loading the cassette in another direction against the guides. All of these forces and guides maintain the cassette in proper position with no free play. A device is provided for limiting the raised position of the cassette holder to a specific point. A spring device is provided so that the holder may only have two natural positions, namely, raised or lowered.

The present invention consists in such novel features, construction arrangements, combination of parts and improvements as may be shown and described in connection with the device herein disclosed by way of example only and as illustrative of a preferred embodiment. Objects and advantages of the invention will be set forth in part hereafter and in part will be obvious herefrom or may be learned by practicing the invention. The invention solves the problems hereinabove outlined by simple and foolproof means.

It is an object of the invention to provide means for sideways inserting a cassette-type cartridge into a holder while the device is in an inoperative condition.

Another object of the invention is to provide separate driving means for both the winding and the unwinding spool in the cassette as well as further independent driving means for the tape driving capstan in the device.

A further object of the invention is to provide means for playing or recording the tape in either direction without having to remove and turn over the cassette.

It is a still further object of the invention to provide sensing means in connection with removable tabs in the rear surface of the cassette for controlling the erasing or recording function of corresponding electronic heads in the device.

Yet another object of the invention is to provide a device which is simple and foolproof to operate.

Various further and more specific purposes, features and advantages will clearly appear from the detailed description given below taken in connection with the accompanying drawings which form part of this specification and illustrate merely by way of example one embodiment of the device of the invention.

BRIEF DESCRIPTION OF THE DRAWING

In the following description and in the claims, parts will be identified by special names for convenience, but such names are intended to be as generic in their application to similar parts as the art will permit. Like reference characters denote like parts in the several figures of the drawing, in which:

DESCRIPTION OF THE PREFERRED EMBODIMENT

Figure 1:
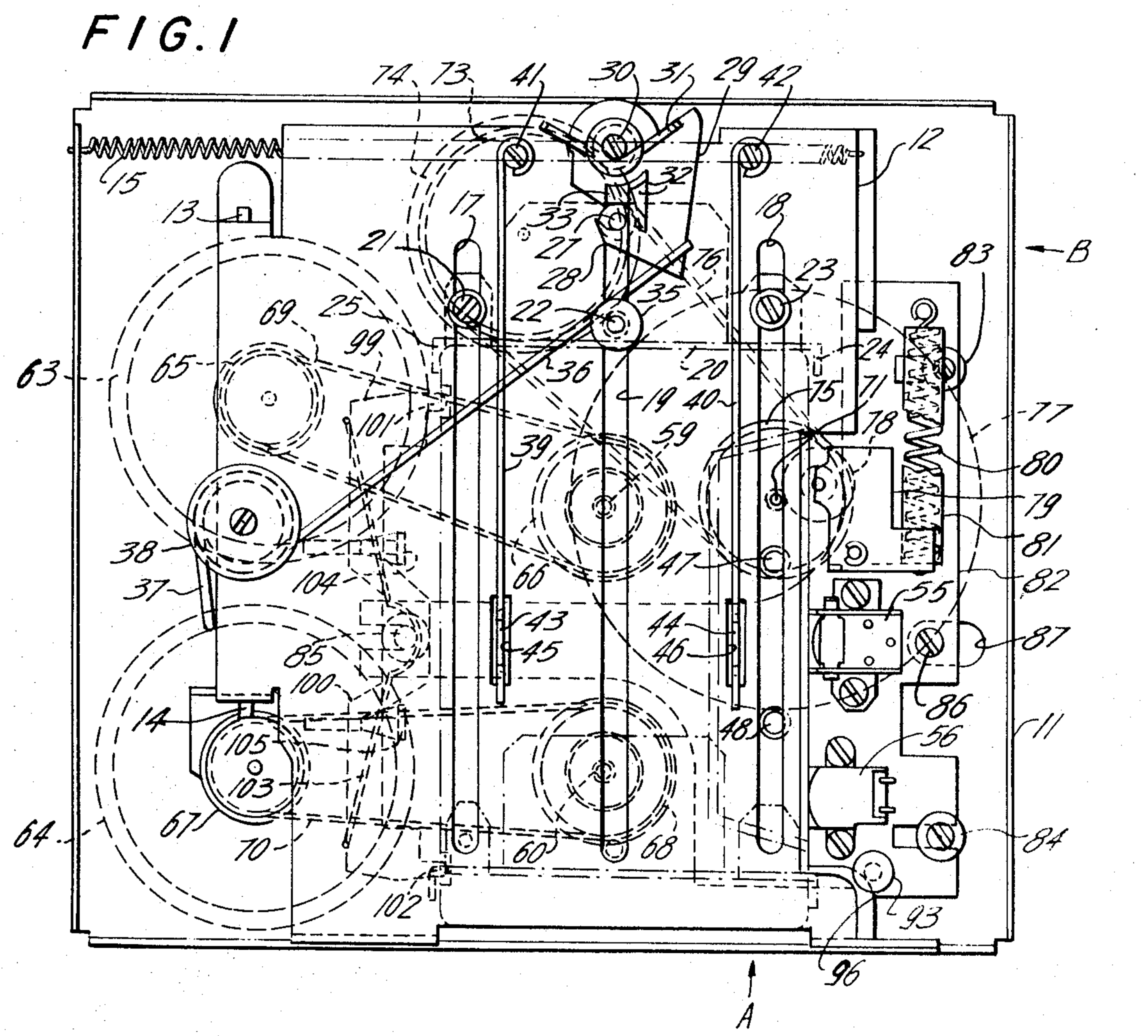
FIG. 1 shows a plan view of a device embodying the invention.
Figure 2:
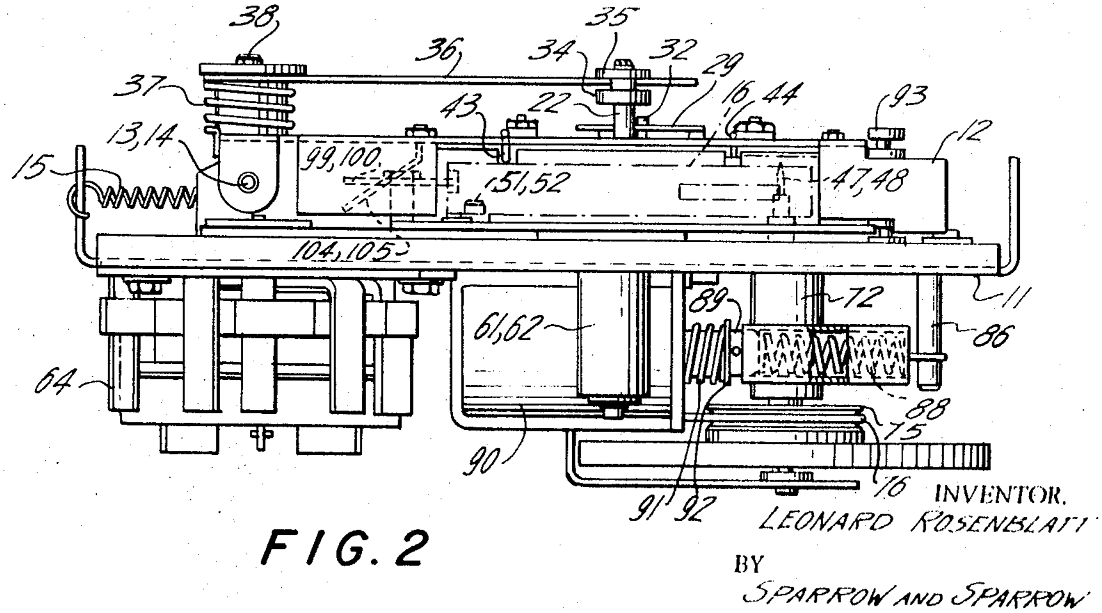
FIG. 2 shows a front view of the device shown in FIG. 1 viewed in the direction of the arrow "A", with the cassette holder in the closed and locked position.
Figure 3:
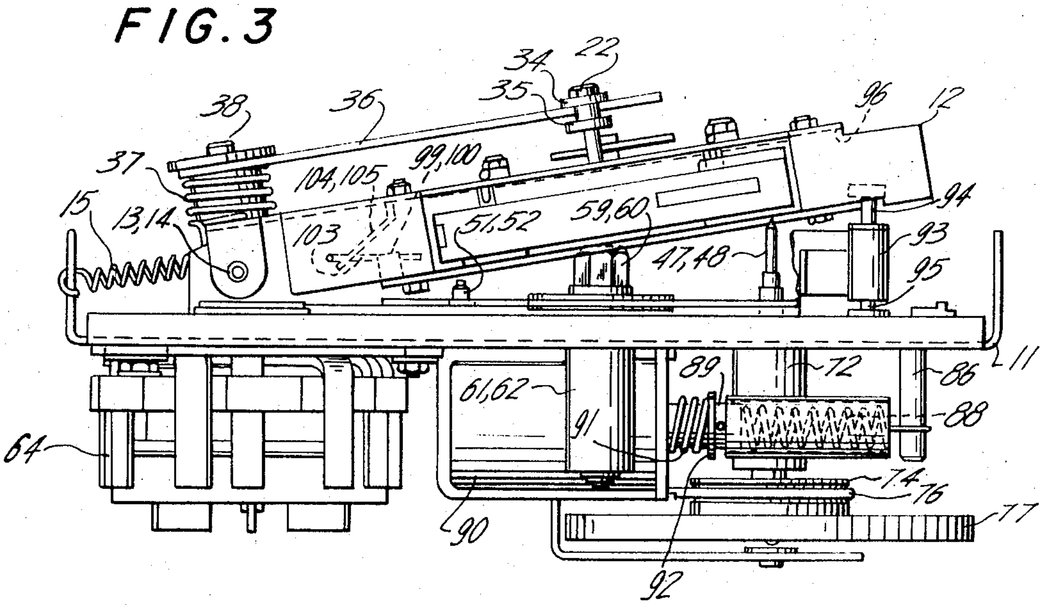
FIG. 3 shows the front view of the device, as shown in FIG. 2 with the cassette holder in the open position, ready for inserting a cassette.

Referring now in more detail to the drawing illustrating a preferred embodiment by which the invention may be realized, there is a baseplate 11 on which a cassette holder 12 is mounted in hinges 13, 14 so that it may be swung upwardly like a lid. The movement of holder 12 is limited by a conventional catch which is not shown in the drawing. A tension spring 15 is fastened with one of its ends to base 11 and with the other end to the front end of holder 12 in a togglelike manner providing a distinct holding position when holder 12 is open and another position when holder 12 is closed.

Figure 5:
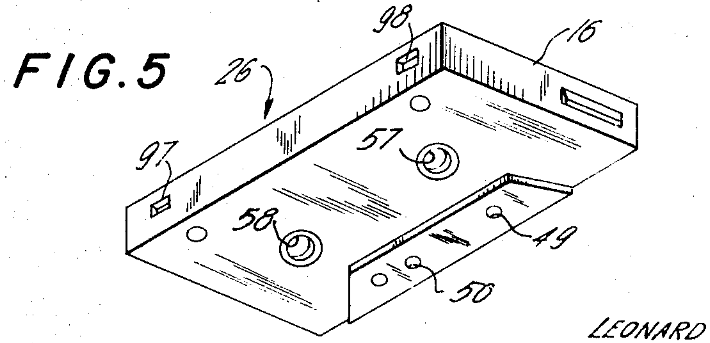
FIG. 5 is an isometric view of the tape cassette, seen from underneath.

Holder 12 is built like a flat box accommodating a cassette-type tape cartridge 26 (FIG 5). Three guide slots 17, 18, 19 are provided in the top of holder 12. A slide 20 is arranged in said flat box of holder 12, having guide posts 21, 22, 23 running in slots 17, 18, 19. Slide 20 has two short front ends 24, 25 bent at a right angle for forming a receptacle for cassette 26 which fits with its shorter side 16 between ends 24, 25. A further post 27 is attached to slide 20 which is arranged to be engaged behind a hook 28 of a latch 29 which is swingably mounted on a stud 30 and which is loaded in the clockwise direction of rotation by a torsion spring 31. Post 27 slides also in slot 19. Latch 29 has a small upwardly bent guide piece 32 which normally abuts against post 27 and limits the clockwise rotation of latch 29. However, when slide 20 is pushed deeper forwardly into the slot 33 of latch 29, the head of post 27 can slip under bent guide piece 32 permitting latch 29 to rotate slightly more clockwise and to tilt upwardly so that post 27 may slip back and out of engagement with hook 28.

Guidepost 22 extends upwardly and has two collars 34, 35 at its upper end. The long arm 36 of a spring 37 abuts against post 22 and is guided between collars 34, 35. Springs 37 is coiled around a stud 38 which is mounted on top of holder 12. Thus spring arm 36 urges slide 20 outwardly when post 27 is released from latch hook 28. Since cartridge 26 is inserted into holder 12 by pressing it against slide 20, it is guided by slide 20, and when slide 20 is released, it ejects cartridge 26 by the force of spring arm 36.

Two elongated wire springs 39, 40 are mounted on pins 41, 42 on top of holder 12. Springs 39, 40 extending in parallel relationship to one another longitudinally of cartridge 26, have two downwardly bent U-shaped portions 43, 44 which reach through two cutouts 45, 46 in the top of holder 12. When cartridge 26 is inserted into holder 12 with the aid of slide 20. When cartridge 26 is inserted into holder 12 with the aid of slide 20, U-shaped portions 43, 44 press down on top of cartridge 26 and hold it by friction in place.

Two pointed pins 47, 48 are mounted on baseplate 11, which fit into corresponding holes 49, 50 of cartridge 26, and two further shorter pins 51, 52 are mounted on baseplate 11 opposite pins 47, 48. Pins 51, 52 are rests for cartridge 26. When cartridge 26 is fully inserted into holder 12 while the holder is swung upwardly, the two holes 49, 50 will fit correctly over pins 47, 48 and rest on pins 51, 52, thus locating cartridge 26 exactly in the operating position with respect to the magnetic heads 55, 56.

The spools in cartridge 26 have hollow ends 57, 58 extending through the bottom plate of cartridge 26. Corresponding drive shafts 59, 60 are vertically arranged in bearing mountings 61, 62 in baseplate 11. Shafts 59, 60 engage exactly hollow spool ends 57, 58 when holder 12 is lowered into operating position. Two electric motors 63, 64 are fastened on the underside of baseplate 11. Each of motors 63, 64 drives independently by way of pulleys 65, 66 and 67, 68 and belts 69, 70 the corresponding drive shafts 59, 60.

The magnetic tape of cartridge 26 is driven by a capstan 71 which is mounted in a vertical bearing retainer 72 and which is driven by an electric motor 73 by way of pulleys 74, 75 and belt 76. A flywheel 77 is also mounted on the vertical shaft of capstan 71 for preventing any fluctuations of the revolutions of capstan 71. A preferably rubber or plastic roller 78, mounted on a bellcrank lever 79, is pressed against capstan 71 for providing a positive friction drive of the magnetic tape of cartridge 26, by a tension spring 80 attached to one end of bellcrank lever 79. Spring 80 is enclosed in a tubelike spacer 81 for limiting the stroke of bellcrank lever 79 and for keeping it in the correct position with respect to capstan 71.

Magnetic heads 55, 56 bellcrank lever 79 and spring 80 are mounted on a horizontally sliding plate 82 which is guided by posts 83, 84 and 85 for precise movement. A stud 86 which is fastened on sliding plate 82 extends downwardly through a cutout 87 of baseplate 11. A tension spring 88 is fastened with one end on stud 86, whereas the other end of spring 88 is fastened on the armature 89 of a solenoid 90. A further spring 91 is also arranged on armature 89, which abuts against a washer 92 which is fastened on armature 89. Spring 91 is less powerful than the pulling force of solenoid 90 and serves to provide for a return stroke of armature 89 and thus of sliding plate 82 when solenoid 90 is deenergized.

Figure 4:
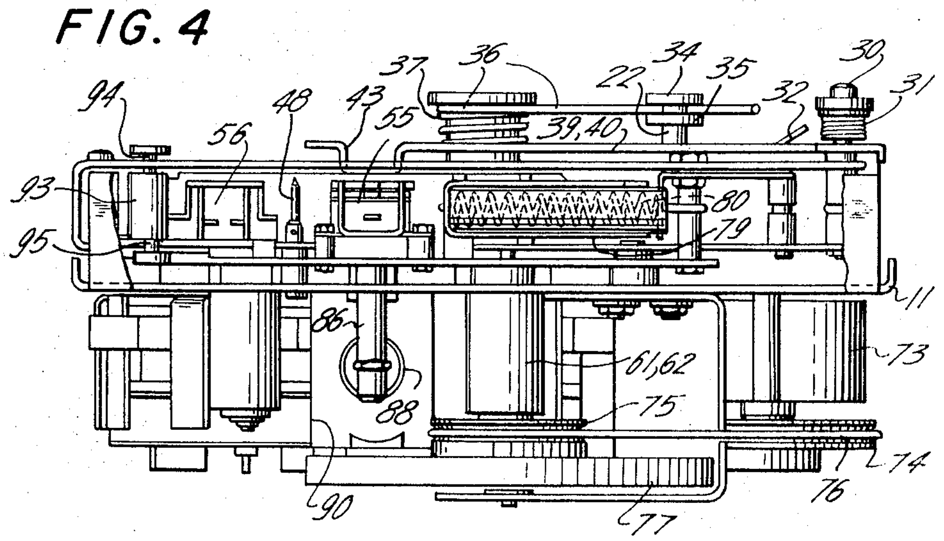
FIG. 4 is a side view of the device shown in FIG. 1, viewed in the direction of the arrow "B"

A vertical stud 93 is mounted on sliding plate 82, which has two recesses 94 and 95. When sliding plate 82 is in the retracted position, recesses 94 and 95 release the corner 96 of holder 12 so that it can be lifted for taking the cassette out or reloading the holder with a new cassette. When holder 12 then is lowered into the operating position and when sliding plate 82 is pulled into its operating position by energizing solenoid 90, corner 96 of holder 12 engages recesses 94 and 95 (see FIGS. 1 and 4), thus locking holder 12 in the operating position.

In the rear surface of cassette 26 are two removable tabs 97, 98. If the recording on one track or set of tracks on the magnetic tape is to be kept and not accidentally erased, the appropriate tab is removed, leaving a recess open. Two independent feelers or sensors 99, 100 are swingably arranged on guide post 85. Sensors 99, 100 have nose ends 101, 102 which are adapted to engage the recesses which are opened by removing tabs 97, 98. Sensors 99, 100 are pressed by a spring 103 against the side of cartridge 26, thus aiding in locking of cassette 26 against locating pins 47 and 48. Two inclined members 104, 105 are arranged on holder 12 in such a manner as to move sensors 99, 100 back when holder 12 is raised. This operation also moves nose ends 101, 102 out of engagement with the recesses , as the case may be. When holder 12 is fully raised, cassette 26 is entirely free for being removed. Sensors 99, 100 are independently mechanically or electrically connected with the erasing and recording functions. Sensors 99 and/or 100 may engage the recess or recesses when tabs 97 and/or 98 have been removed. The corresponding movement of said sensor or sensors causes the erasing and recording functions for those tracks to be deactivated.

While the invention has been described and illustrated with respect to a certain preferred example which gives satisfactory results, it will be understood by those skilled in the art after understanding the principle of the invention that various other changes and modifications may be made without departing from the spirit and scope of the invention.

I claim:

1. A tape recording reproducing mechanism having both recording reproducing heads and an erasing head for use with a rectangularly shaped cassette-type tape cartridge, said cartridge having two long sides and two short sides and two spools for winding and unwinding said tape; said mechanism comprising a base, a pivotally mounted cassette holder on said base, said holder having a loading and an operative position, and being angularly displaceable relative to said base, said holder being adapted to first receive one of said short sides of said cartridge in said loading position, an independently movable mounting plate for at least one of said heads and being movable independent of the movement of said holder, said movable plate having an operative position wherein at least one of said heads operatively engages the tape through one of said long sides and an inoperative position offset from said operative position so as to allow the pivoting of said holder into said holder operating position, means for moving said movable plate from said inoperative position to said operative position after the holder has been pivoted into said operative position, a plurality of drive means for independently driving each one of said spools and for driving said tape, said holder having a cavity shaped for accommodating said cassette short side first, and a plurality of locating means on said base for locating said cassette relative to said base and independent of the location of said cassette in said holder when said holder is in said operating position whereby the opening area of said cavity receiving first said cassette short side is substantially coplanar with a boundary surface of said mechanism, said cartridge having at least two recesses on the other of said long sides, said recesses having removable covers therefor, retractable sensor means mounted on said base, said sensor means having an operative and an inoperative position, said sensor means adapted to engage at least one of said recesses, when said cover is removed, inclined means on said holder for retracting said sensor means from said operative position to allow removal of said cartridge thereof when said holder is moved from said operating position to said loading position, each of said recesses being associated with a set of sound tracks on said tape of said cassette, said sensor means adapted for sensing the presence or absence of said removable covers by moving to engage one of said recesses where said cover thereof is absent, and electrical means connecting said sensor means with said recording and erasing heads of said tape recording reproducing mechanism, said sensor means deactivating by the movement thereof said recording and erasing heads, respectively, for said tracks associated with said recess.

2. A tape recording/reproducing mechanism according to claim 1, and a spring-loaded slide in said cavity for holding and for guiding said cassette, said slide having a plurality of parallel guiding means in said holder and having a loading and an operative position therein, and latch means on said holder for holding said slide in said loaded position.

3. A tape recording/reproducing mechanism according in claim 1, and spring means on top of said holder for maintaining said cassette in place in said holder in the longitudinal direction by friction engagement when said cassette is loaded into said holder.

4. A tape recording/reproducing mechanism according to claim 2, and spring means on top of said holder for maintaining said cassette in place in said holder in the longitudinal direction by friction engagement when said cassette is loaded into said holder.

5. A tape recording reproducing mechanism according to claim 1, and lever means mounted on said independently movable mounting plate for providing a source of adjustment, tension spring means attached to said lever means, and a roller freely rotatably mounted on said lever means, said roller abutting against said driving means for said tape under the influence of said tension spring means.

6. A tape recording/reproducing mechanism according to claim 2, and lever means mounted on said independently movable mounting plate for providing a source of adjustment, tension spring means attached to said lever means, and a roller freely rotatably mounted on said lever, said roller abutting against said driving means for said tape under the influence of said tension spring means.

7. A tape recording/reproducing mechanism according to claim 1, and a solenoid on said base, said solenoid having an armature, means connecting said armature with said independently movable mounting plate, said armature adapted to pull said mounting plate into said operating position when said solenoid is energized, spring means on said armature for performing the return stroke thereof and stroke limiting means on said spring means.

8. A tape recording/reproducing mechanism according to claim 2, and said moving means includes a solenoid on said base, said solenoid having an armature, means connecting said armature with said independently movable mounting plate, said armature adapted to pull said mounting place into said operating position when said solenoid is energized, spring means on said armature for performing the return stroke thereof and stroke limiting means on said spring means.

9. A tape recording/reproducing mechanism according to claim 1, and means for locking said holder out of its operating position when said independently movable mounting plate is in its operating position.

10. A tape recording/reproducing mechanism according to claim 1, and means for locking said holder in its operating position when said independently movable mounting plate is in its operating position.

11. Tape recording/reproducing mechanism according to claim 1, and means for locking said holder in or out of its operating position selectively when said independently movable mounting plate is in its operating position.

12. A tape recording/reproducing mechanism according to claim 1, said cartridge having two recesses normally covered by covers, and two sensor means movably mounted on said base, pressure means on said sensor means to hold said sensors against said cassette, said sensors being adapted to engage at least one of said recesses when at least one of said covers has been removed, and means on said holder for retracting said sensor means form its engaged position when said holder is moved from its operating position to its loading position.